Feb. 24, 1970     G. EHRENBERG ET AL     3,497,398
BULLET-SHAPED DROP THERMOCOUPLE
Filed Jan. 17, 1966     2 Sheets-Sheet 1
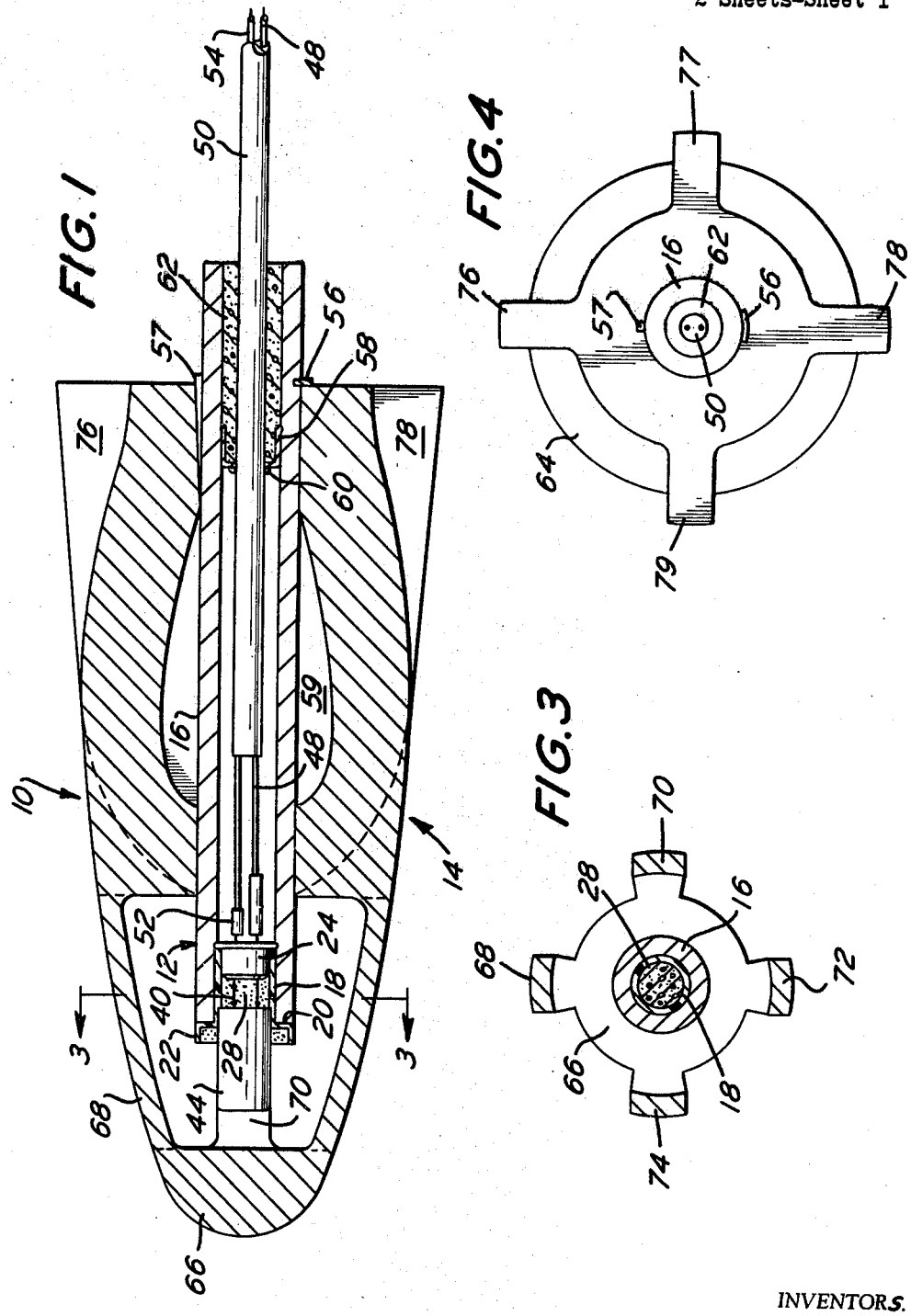
INVENTORS.
GUSTAVE EHRENBERG
BY MARVIN J. LOWDERMILK
ATTORNEYS.

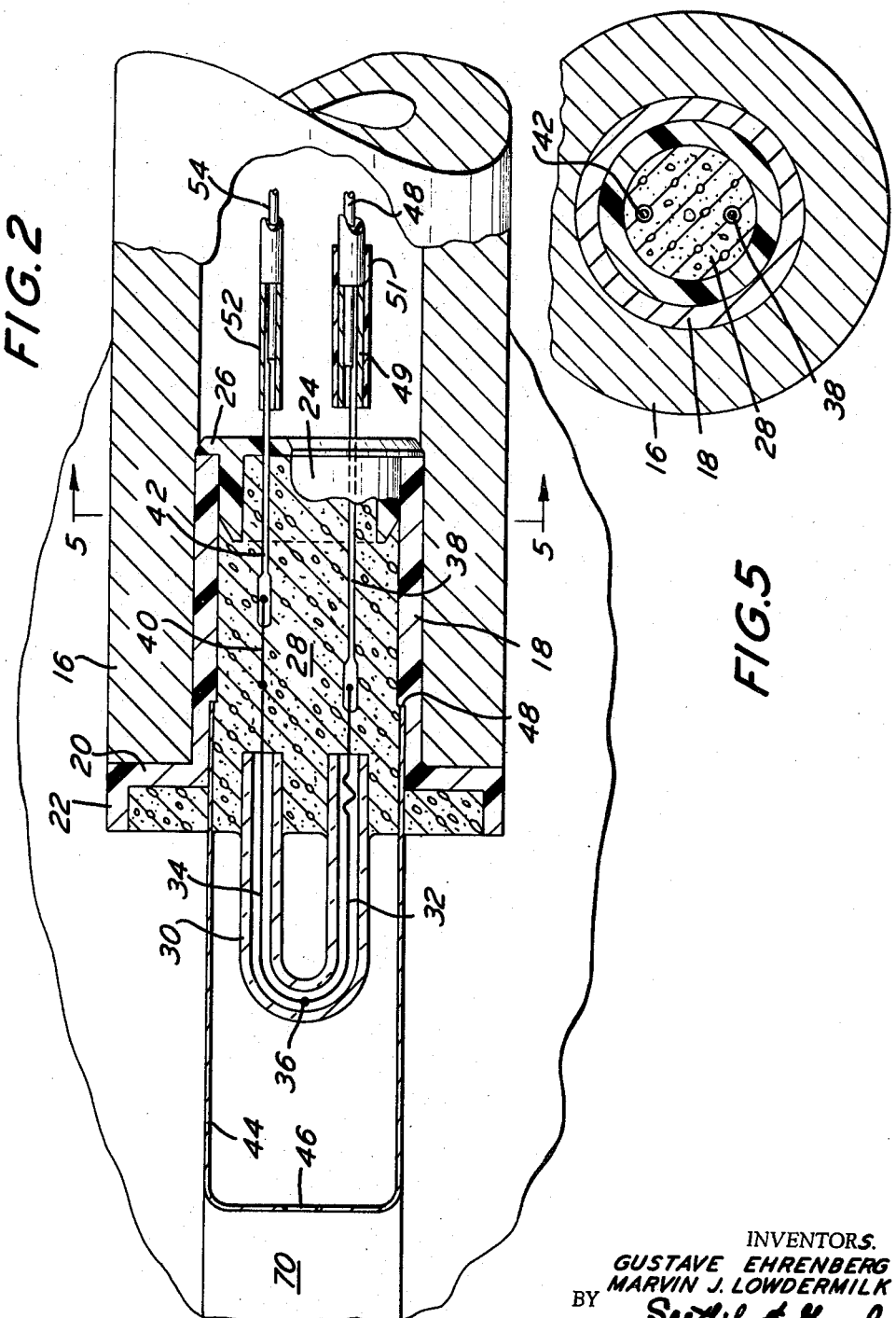

United States Patent Office 3,497,398
Patented Feb. 24, 1970

3,497,398
BULLET-SHAPED DROP THERMOCOUPLE
Gustave Ehrenberg, Havertown, Pa., and Marvin J. Lowdermilk, Haddonfield, N.J., assignors to Electro-Nite Co., a corporation of Pennsylvania
Filed Jan. 17, 1966, Ser. No. 521,160
Int. Cl. H01v 1/02
U.S. Cl. 136—227                                 7 Claims

ABSTRACT OF THE DISCLOSURE

A drop thermocouple is provided having a weight attached thereto so that it may be dropped into a basic oxygen furnace. The weight includes a body portion supporting the thermocouple and a nose portion which protects the thermocouple from direct contact with the surface of the bath and any slag thereon when the thermocouple is dropped from a substantial height into the furnace. By using a three-legged thermocouple assembly, the cost for the long lengths of lead wires may be reduced by using uncompensated copper wires.

---

This invention relates to a thermocouple, and more particularly, to an expandable thermocouple particularly adapted for use in the measurement of the bath temperature in a basic oxygen furnace.

Heretofore, a large number of thermocouples have been proposed and used in the measurement of bath temperatures. These expendable thermocouples, as used commercially, are mounted on the end of a lance and supported in a manner so that they may be inserted into the bath below the level of the slag thereof. The thermocouple elements are short in length, such as approximately one inch long. In a platinum-platinum rhodium thermocouple assembly, the platinum leg of the short thermocouple assembly and the platinum rhodium leg are coupled to a recorder by means of a pair of compensated lead wires. The compensated pair of lead wires, copper and a copper 11% nickel alloy, has the same thermoelectric characteristics as the platinum, platinum rhodium thermocouple up to an approximate temperature of 300° F. When the compensated lead wire is used, this allows the cold junction of the thermocouple to be transferred to and mounted within the recording instrument for automatic compensation of ambient temperature.

The compensating pair of lead wires are made of cheaper materials, and therefore are used for economic reasons between the instrument and the short thermocouple elements. Insofar as the instrument is concerned, it only "sees" the thermocouple elements. The compensating lead wires eliminate the necessity of running the thermocouple elements all the way back to the instrument.

When measuring the bath temperature in a basic oxygen furnace, problems are presented which make it impractical to use the thermocouple units proposed heretofore. In a basic oxygen furnace, the shell is of sufficient capacity in some commercial units so that steel is made at the rate of ten tons per minute. In order to take the bath temperature in a basic oxygen furnace in the same manner as proposed heretofore with expendable thermocouple lances, it is necessary to raise the oxygen lance upwardly out of the furnace shell, shut off the supply of oxygen, rotate the shell on its trunnions. Thereafter, the temperature may be taken according to conventional techniques whereupon the reverse of the process will be effected so that the steel making process may be continued. The raising of the oxygen lance, rotating the furnace shell, etc., takes approximately three to four minutes. During this three to four minutes, there is a loss of production in the nature of thirty to forty tons of steel. Accordingly, it is impractical and uneconomical to utilize the temperature measuring techniques employing expandable thermocouples as proposed heretofore. Nevertheless, it is essential to know the temperature of the bath in a basic oxygen furnace.

In order to take the temperature of the bath in a basic oxygen furnace, it appears that the only practical way to accomplish the same is to drop the expendable thermocouple into the furnace from a position thereabove. When this is done, the expandable thermocouple will be consumed by the bath. In order to have the thermocouple connected to an indicator or recorder so that the temperature may be ascertained, it is necessary to connect the thermocouple assembly to the recorder by compensating lead wires having a length of approximately thirty to sixty feet. After a single reading is taken, the thermocouple assembly is consumed by the bath and the lengths of the compensating lead wires are discarded as scrap. Since one of the leads should be No. 11 alloy, the cost of this compensating lead wire approximates the cost of the entire thermocouple assembly and thereby renders the cost of a temperature measurement expensive.

We propose to substantially reduce the cost of taking a bath temperature measurement in a basic oxygen furnace or for use with any other type of furnace by eliminating the necessity to use an expensive pair of compensating lead wire. We accomplish this by utilizing a three-legged thermocouple assembly. The hot junction of the thermocouple assembly is the connection between the first and second legs of the thermocouple assembly. The third leg is made from the same material as the first leg and is connected to the free end of the second leg. This forms the cold junction. Therefore, instead of having the cold junction located at a remote point such as at the instrument, our thermocouple assembly has the cold junction embedded in the body of refractory material. With this arrangement uncompensated leads, such as a pair of copper wires, can be used for the instrument connection.

The cold junction is protected by a body of refractory material so as to remain substantially at ambient temperature for a sufficiently long period of time so as to enable the thermocouple assembly to enter the bath in the basic oxygen furnace and give a reading for approximately ten seconds. A reading will be ascertained within the first five seconds. The reference junction in the instrument should be at the same temperature as the cold junction in the thermocouple assembly. This may be accomplished in any one of a variety of known ways and may even include the substitution of a dial rheostat calibrated in temperature substituted for the cold junction compensation mechanism in the instrument. The temperature dialed in would be the temperature in the storage area for the thermocouple assemblies before they are used in the measurement of a bath temperature.

It is an object of the present invention to provide a novel thermocouple assembly.

It is another object of the present invention to provide an expendable thermocouple assembly which has a cold junction expendable therewith and therefore does not require compensating lead wire.

It is another object of the present invention to provide an expendable thermocouple assembly which substantially reduces the cost of taking the bath temperature in a basic oxygen furnace.

It is another object of the present invention to provide a novel three-legged thermocouple assembly.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a longitudinal sectional view of a thermocouple assembly in accordance with the present invention coupled to a weight and guide means.

FIGURE 2 is a longitudinal sectional view of the thermocouple assembly illustrated in FIGURE 1 but on an enlarged scale.

FIGURE 3 is a sectional view taken along the line 3—3 in FIGURE 1.

FIGURE 4 is a righthand end elevation view of the assembly illustrated in FIGURE 1.

FIGURE 5 is a sectional view taken along the line 5—5 in FIGURE 2.

Referring to the drawing in detail, wherein like numerals indicate like elements, there is illustrated an expendable thermocouple designated generally as 10. The expendable thermocouple 10 is particularly adapted for use in measuring the temperature of a bath in a basic oxygen furnace and includes a thermocouple assembly designated generally as 12 connected to a weight and guide means 14.

The thermocouple assembly 12 includes a hollow support structure made from a thermally insulating material such as cardboard tube 16. Tube 16 is short in length such as between about three and nine inches. A liner tube 18 is provided within one end of tube 16. Tube 18 may be made from a polymeric material such as polyethylene and provided with a radially outwardly directed flange 20 integral with an axially directed flange 22. Flange 22 forms a continuation of the outer periphery of tube 16.

A hollow plug 24 is force-fitted into the end of tube 18 which is disposed within the tube 16. Plug 24 is preferably made from a polymeric material similar to that of tube 18. Plug 24 is provided with a radially outwardly directed flange 26 which overlies the adjacent end face of the tube 18. A refractory material such as Saueriesen cement 28 fills the plug 24 and tube 18 including the cavity formed by the axially directed flange 22.

A U-shaped tube 30 is provided. Tube 30 is preferably made from a transparent refractory material such as Vycor. The ends of the tube 30 are embedded within the refractory material 28. The bight portion of the tube 30 projects to a point spaced from the front face of the material 28 by a distance of approximately ½ inch to 1½ inches. A first thermocouple element 32 is provided. Element 32 has one end disposed within the refractory material 28. The other end of the element 32 is located at the bight portion of tube 30.

A second thermocouple element 34 is provided. Element 34 has one end embedded within the refractory material 28. The other end of element 34 is adjacent the bight portion of the tube 30 and connected to the thermocouple element 32 to form a hot junction 36. In an operative embodiment, element 32 is made from platinum-rhodium, has a length of approximately 1⅛ inches long, and a diameter of .003 inch. Element 34 was made from platinum having a similar length and diameter.

A thermocouple element 40 has one end connected to the free end of element 34, thereby forming the cold junction. Thermocouple element 40 is made from the same material as element 32. Thermocouple element 40 likewise has a diameter, in the illustrated embodiment, of .003 inch but has a length which is substantially shorter than the length of thermocouple element 32. In the illustrated embodiment referred to above, wherein element 32 had a length of 1⅛ inches, element 40 has a length of .375 inch.

A lead wire conductor made from an inexpensive material such as copper and designated by the numeral 38 has one end connected to the free end of thermocouple element 32 within the refractory material 28. Conductor 38 extends through a hole in the end face of the plug 24 and projects for a short distance therebeyond. A lead wire of duplicate material to lead wire 38 and designated by the numeral 42 has one end connected to the free end of thermocouple element 40. Conductor 42 likewise extends through the plug 24 and for a short distance therebeyond. A hollow metal cap 44 made from a material such as steel is provided. The open end of cap 44 extends into the tube 18 and abuts a shoulder 45 on the inner surface of tube 18 as shown more clearly in FIGURE 2. Cap 44 is provided with a hole 46 at the bottom thereof.

The conductors 38 and 42 are adapted to be connected to a recording instrument or the like by way of a two-wire insulated cable 50 containing individually insulated copper wire conductors 48 and 54. Conductors 38 and 48 are electrically coupled to one another by means of a hollow copper crimped tube 49. The ends of conductors 48 and 38 extend into tube 49 and engage one another therewithin. A heat shrinkable plastic sleeve 51 is disposed around tube 49 and the adjacent end of the insulated conductor 48. Heat will be applied to shrink the sleeve 51 around the elements disposed therewithin.

A hollow copper crimped tube 52 is provided. The adjacent ends of conductors 42 and 54 extend into tube 52 and are electrically coupled to one another therewithin. The crimped tubes 49 and 52 are maintained out of any possible contact with one another so as to prevent a short circuit by means of the plastic sleeve 51. Any other conventional device for electrically isolating the tubes 49 and 52 can be utilized as desired. Conductors 48 and 54 are preferably No. 18 gauge wire.

A means is provided to reduce any strain on the connection within the tubes 49 and 52 and to also prevent the entry of molten metal within tube 16. This means includes a cup 58 disposed within tube 16 and retained on the cable 50 by means of a retaining ring 60. A refractory material 62, which may be identical with material 28, is disposed within tube 16 and cup 58 to thereby interconnect cable 50 and tube 16 and prevent the entry of molten metal into tube 16.

The weight and guide means 14 includes a weight body 64 which may be made from a material such as cast iron. Body 64 is generally bullet-shaped. Body 64 has a central bore having spaced aligned concentric surfaces which receive the tube 16. These concentric surfaces are spaced from one another by a central cavity 59. Cavity 59 reduces the area of surface contact between body 64 and the tube 16 for minimum transfer of heat to tube 16.

A means is provided to assure a proper and uniform axial orientation between the thermocouple assembly 12 and the weight and guide means 14. Such means includes a radially outwardly directed staple 56 connected to the tube 16 adjacent one end thereof. Staple 56 limits the extent to which tube 16 may extend into the body 64. Also, a means is provided to prevent undesired relative axial motion between body 64 and tube 16. Such means includes a key 57 which is triangular in cross section and force-fitted into a keyway extending from the end face of body 64 at the righthand end of FIGURE 1. Any other convenient means may be utilized to prevent relative undesired axial motion.

The body 64 is interconnected with a nose portion 66 by means of integral webs 68, 70, 72 and 74. This results in the provision of apertures or windows intermediate adjacent webs so that the molten metal in the bath may have immediate and ready access to contact with the cap 34 and the hot junction therewithin.

The body 64 is provided adjacent its rear face, that is the face opposite from the end having nose portion 66, with fins 76, 77, 78 and 79. A greater or lesser number of fins may be provided. The fins are each aligned with one of the webs 68–74. Thus, web 68 and fin 76 are aligned with one another. The fins stabilize the body 64 aerodynamically so that it does not tumble in free flight as it is being dropped downwardly into the open top of a basic oxygen furnace.

The thermocouple of the present invention is assembled as follows:

The hot junction 36 is formed by welding juxtaposed ends of thermocouple elements 32 and 34 in a conventional manner. Thereafter, these elements are inserted into the U-shaped tube 32. Thermocouple element 40 is welded to the free end of element 34 to form a cold junction. Conductor 38 is welded to the free end of element 32. Conductor 42 is welded to the free end of element 40. Thereafter, the thusly connected elements and conductors are inserted into the tube 18 in a manner so that conductors 38 and 42 project through the plug 24 as illustrated. Thereafter, the refractory cement material 28 is poured into the tube 18 and plug 24. The cap 44 will be forced into material 28 until its open end engages the shoulder 48. Thereafter, material 28 is permitted to harden.

Thereafter, tube 16 as well as cup 58 and ring 60, will be telescoped over the cable 50. Sleeve 51 is telescoped over conductor 48. Conductor 48 will be crimped to conductor 42 by means of crimp tube 49. Sleeve 51 will then be disposed around tube 49 and subjected to heat. Conductors 42 and 54 are electrically coupled to one another by means of crimp tube 52. The tube 16 can now be moved along the cable 50 until tube 18 is force-fitted into the end of tube 16 with flange 20 engaging the end face of tube 16.

Cup 58 and retaining ring 60, previously disposed on the cable 50 are now moved until they enter the tube 16 to approximately the position illustrated in FIGURE 1. Thereafter, refractory material 62 is poured into the tube 16 and permitted to harden. Staple 56 is applied to the tube 16 adjacent the righthand end thereof in FIGURE 6. The thermocouple assembly 12 is now in a position so that it can be inserted into the body 64 until staple 56 engages the rear face of body 64. This will uniformly position the thermocouple assembly with respect to the body 64. Thereafter, key 57 is positioned in its keyway and hammered thereinto until the assembly 12 is coupled to the body 64 with sufficient rigidity so as to prevent relative motion in an axial direction.

In use, the ends of conductors 54 and 48 remote from those illustrated in FIGURE 1 are connected to a recorder. Depending on the size of the basic oxygen furnace, conductors 48 and 54 may have a length of between thirty and sixty feet. The expendable thermocouple as illustrated in FIGURE 1 is then dropped from an elevation above the basic oxygen furnace into the open top thereof. The weight provided by body 64 will cause the thermocouple assembly to enter the bath for a sufficient depth so that a reading may be taken. The fins on the body 64 aerodynamically stabilize the same so that it does not tumble during its free fall into the open top of the basic oxygen furnace.

The weight provided by body 64 offsets the buoyancy of the assembly so as to assure a sufficient depth of penetration. Within about five seconds after entering the bath, a reading will have been obtained on the recorder or other instrument to which the conductors 48 and 54 are connected. Within about ten seconds, the entire expendable thermocouple will have been consumed by the bath and only a short length of about ten to thirty feet of the cable 50 will remain connected to the instrument. This short length of the cable is then disconnected from the recording instrument and discarded as scrap. Since the cable 50 is made from commercially available relatively inexpensive pair of copper wires, the scrap value of cable 50 is minimal. The use of a pair of compensating lead wires such as No. 11 alloy and copper between one thermocouple and the recording instrument is no longer necessary due to the presence of thermocouple element 40. The cost of the short thermocouple element 40 is minimal compared with the cost of forty, fifty or sixty feet of a compensated pair of lead wires. As a result of the present invention, it is now possible to use expendable thermocouples when taking the temperature of a bath within a basic oxygen furnace while at the same time having a practical and inexpensive expendable thermocouple.

The present invention may be embodied in other specific forms without departing from the spirit or essential attributes thereof and, accordingly, reference should be made to the appended claims, rather than to the foregoing specification as indicating the scope of the invention.

It is claimed:

1. An expendable thermocouple assembly comprising a cardboard tube, first and second thermocouple elements connected to form a hot junction, said hot junction being spaced from one end of said tube, a first mass of refractory material plugging one end of said cardboard tube and enveloping the free ends of said thermocouple elements, a second mass of refractory material spaced from said first mass and plugging the other end of said cardboard tube, non-compensating lead wire conductors having a length at least 300 times the length of said first thermocouple element, each conductor being coupled and electrically connected to a free end of said elements, each conductor extending through said second mass, and a weight having substantially the same length as said tube, said weight being made from metal disposed around said tube for reducing the buoyancy of the assembly, said weight being of a bullet-shaped configuration and having fins to impart aerodynamic stability to said weight.

2. An assembly in accordance with claim 1 wherein said metal weight includes two coaxial central bores, said cardboard tube contacting each bore.

3. An assembly in accordance with claim 1 wherein said metal weight has a nose portion axially disposed with respect to said hot junction and spaced therefrom, said metal weight having circumferentially disposed openings immediately to the rear of said nose portion so that molten metal can enter the location adjacent the hot junction.

4. An assembly in accordance with claim 1 including a third thermocouple element, said third thermocouple element being made from the same material as said first thermocouple element but being shorter than the first thermocouple element, said third thermocouple element being connected to a free end of said second thermocouple element within said first mass of refractory material, one of said lead wire conductors being connected to a free end of said first thermocouple element, the other of said conductors being connected to a free end of said third thermocouple element.

5. An assembly in accordance with claim 1 including means for axially orientating the position of the hot junction with repsect to the weight, whereby a plurality of thermocouple assemblies manufactured on a mass production basis will all have the hot junction at a particular location with respect to an orientation surface on the weight, and means for coupling the cardboard tube to the weight so as to prevent undesired relative motion therebetween.

6. An expendable thermocouple assembly comprising a short cardboard tube, first and second thermocouple elements supported by said tube and connected to form a hot junction, said hot junction being spaced from one end of said tube, a mass of refractory material plugging said one end of said tube and enveloping the free ends of said thermocouple elements, a metal weight disposed around and supporting said tube and having substantially the same length as said tube, said metal weight having a bullet-shaped configuration including a body portion and a nose portion, said portions being connected together by web portions so as to define windows between said body and nose portions so as to provide access for molten metal to the hot junction, said nose portion being aligned with the hot junction but being spaced therefrom in order to protect said thermocouple elements from impact forces applied to the nose portion, and said body portion having fins to impart an aerodynamic stability to said body.

7. An assembly in acordance with claim 6 including a pair of copper conductors each connected to one of the thermocouple elements, said conductors having a length at least three hundred times the length of said thermocouple element, and said conductors projecting through an end of said metal weight which is opposite said nose portion.

References Cited

UNITED STATES PATENTS

| | | | |
|---|---|---|---|
| 3,347,099 | 10/1967 | Schraeder | 136—234 X |
| 3,374,122 | 3/1968 | Cole | 136—234 |
| 2,430,887 | 11/1947 | Ray | 136—217 X |
| 2,466,274 | 4/1949 | Ray | 136—227 X |
| 3,038,951 | 6/1962 | Mead | 136—234 |
| 3,221,556 | 12/1965 | Campbell et al. | |

FOREIGN PATENTS 681,508   3/1964   Canada.

WINSTON A. DOUGLAS, Primary Examiner

M. J. ANDREWS, Assistant Examiner

U.S. Cl. X.R.

136—231